United States Patent [19]

Ludwig et al.

[11] 4,045,264
[45] Aug. 30, 1977

[54] METHOD OF MANUFACTURING PLASTIC SHELLS FOR DRUMS

[75] Inventors: William F. Ludwig, Oak Brook; Daniel S. Mikosz, Arlington Heights, both of Ill.

[73] Assignee: Ludwig Industries, Chicago, Ill.

[21] Appl. No.: 760,564

[22] Filed: Jan. 19, 1977

[51] Int. Cl.² .............................................. B31C 5/00
[52] U.S. Cl. ........................ 156/63; 84/411 R; 84/452 P; 93/94 R; 156/203; 156/258; 156/304; 264/295; 264/322
[58] Field of Search .................... 84/411 R, 452 P; 156/63, 257, 260, 258, 304, 203; 93/94 R; 264/295, 322

[56] References Cited

U.S. PATENT DOCUMENTS

| | | | |
|---|---|---|---|
| 2,703,299 | 3/1955 | Seymour et al. | 156/258 |
| 3,791,249 | 2/1974 | Frido et al. | 84/411 |

Primary Examiner—Edward G. Whitby
Attorney, Agent, or Firm—W. Melville Van Sciver

[57] ABSTRACT

The method of manufacturing shells of plastic material, such as methyl methacrylate, for percussion musical instruments. The shells are formed from flat pieces of plastic material which may be clear plastic, transparent colored or opaque plastic material of one or more colors. The invention contemplates providing an infinitesimal number of color design combinations. After the pieces of plastic material are cut, prepared and fastened together by novel methods, the material is formed into a cylindrical product which is joined at one location to provide an integral shell. By cutting the flat pieces of plastic material in various ways and joining them together, an extremely wide range of different visual designs are produced.

The method contemplates forming a novel surface at the edges of the plastic material for adhesively connecting adjacent panels together and also contemplates the use of an adhesive material, such as gluing, which is not deformable until it reaches a temperature considerably above that at which the plastic material is deformable.

16 Claims, 26 Drawing Figures

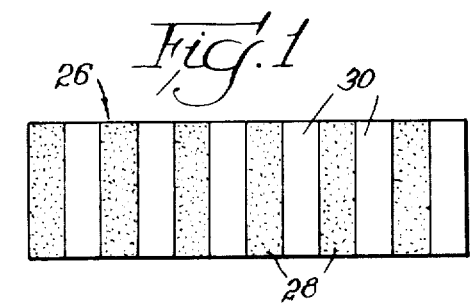
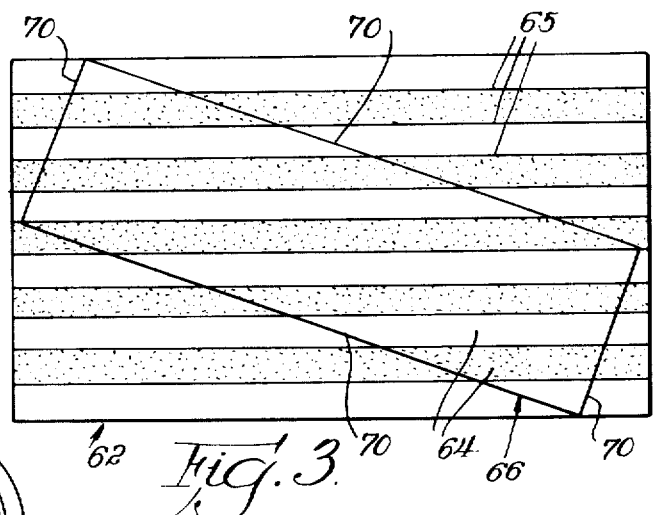
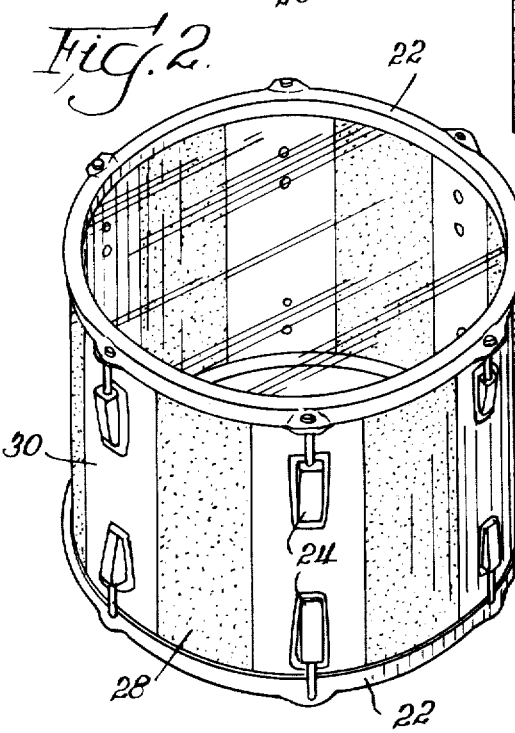
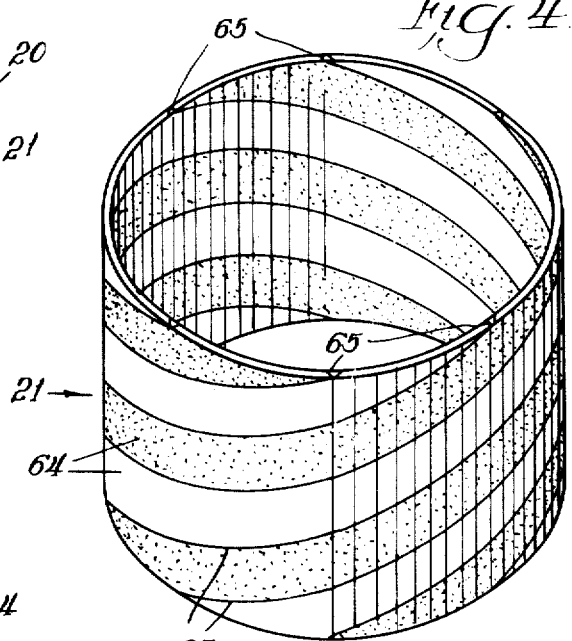
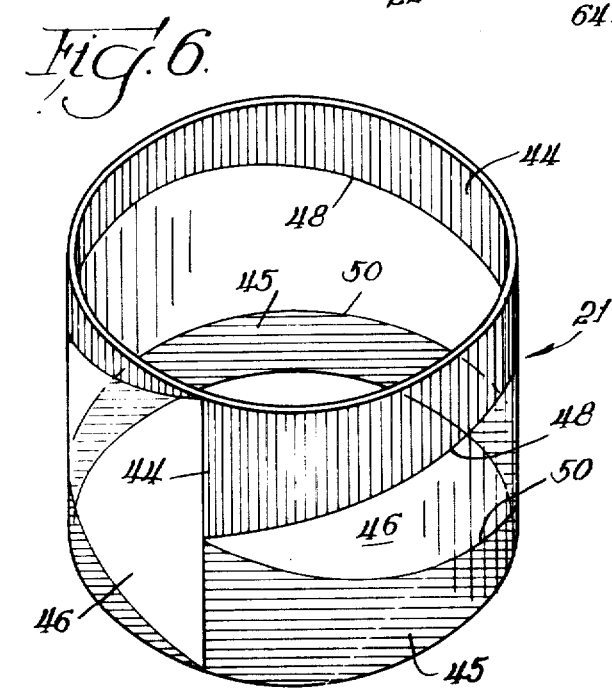
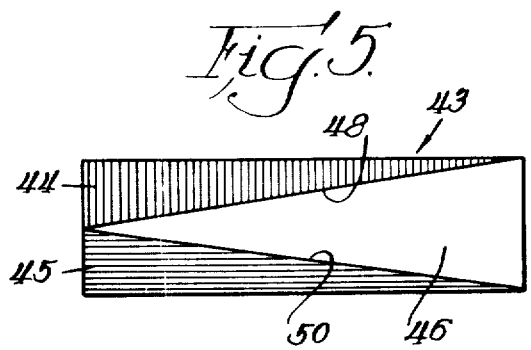

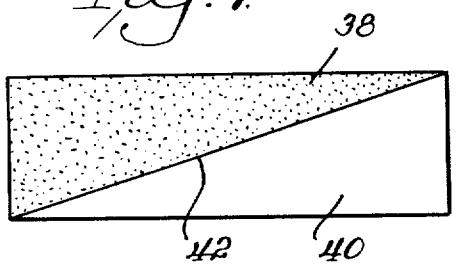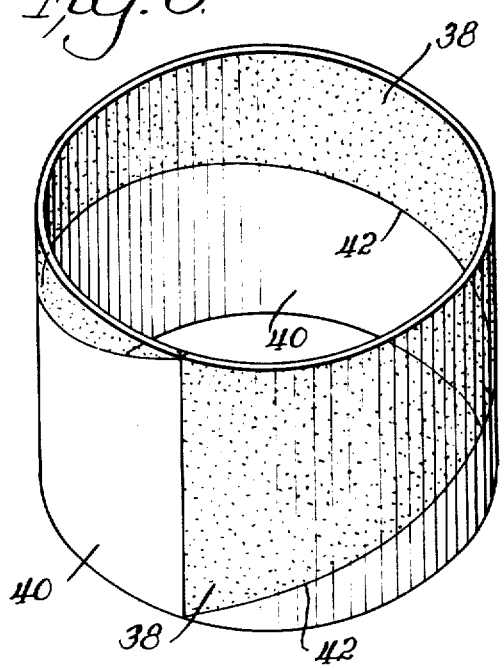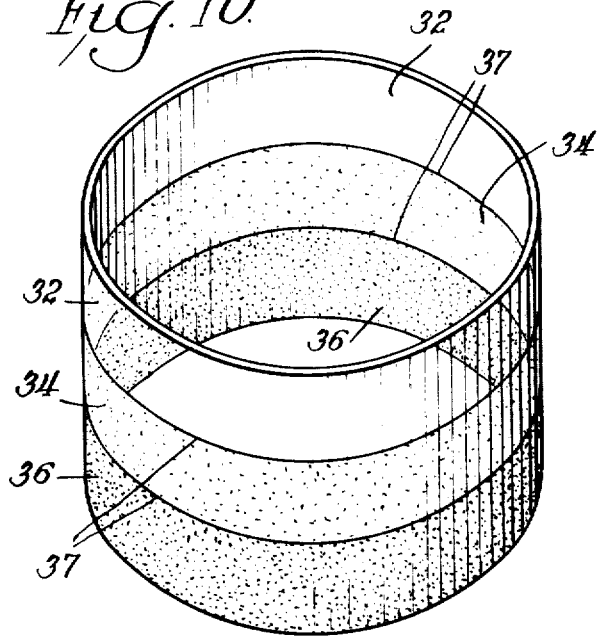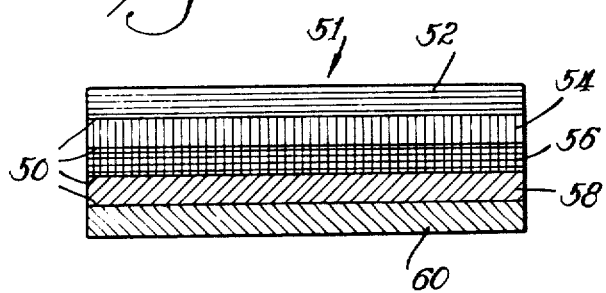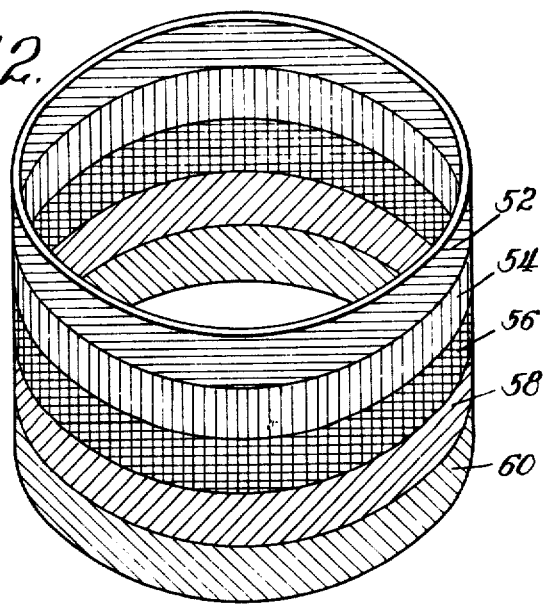

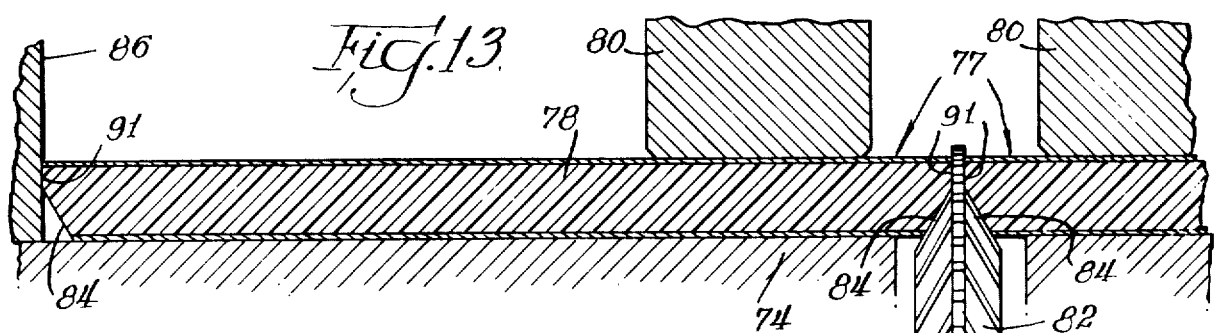
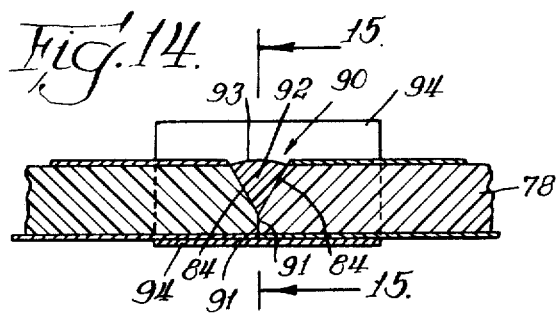
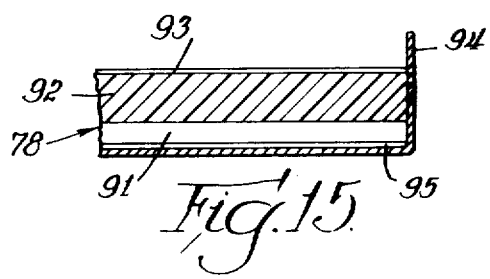
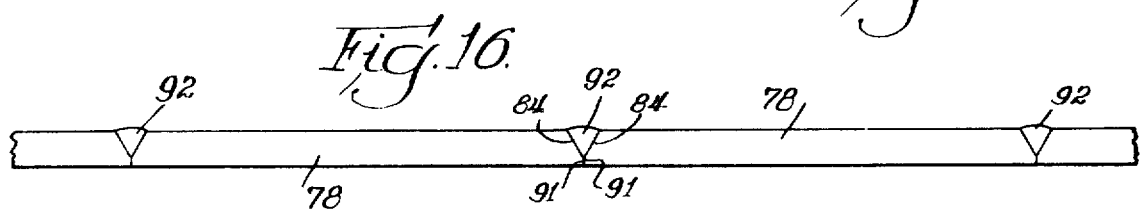
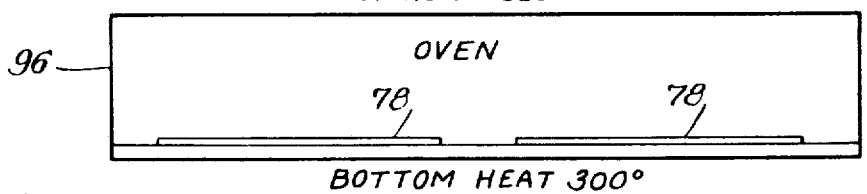
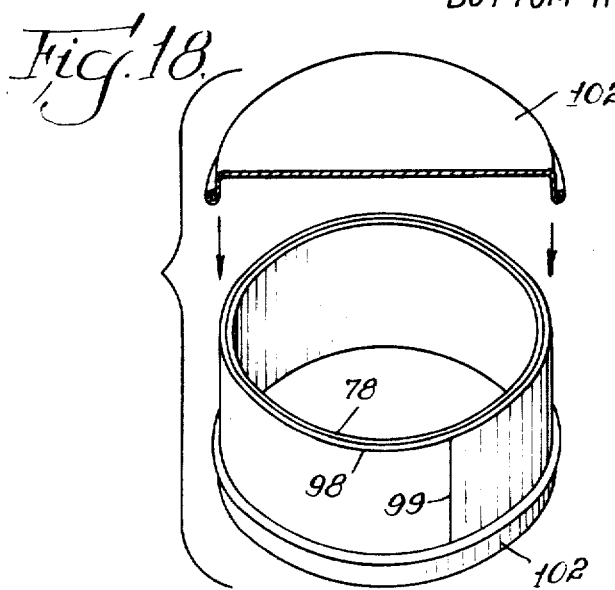
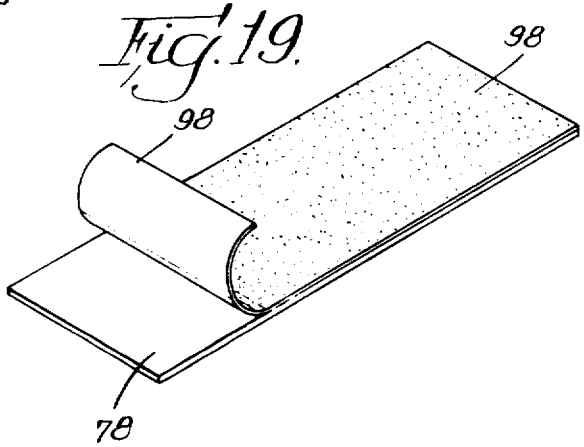

METHOD OF MANUFACTURING PLASTIC SHELLS FOR DRUMS

BACKGROUND OF THE INVENTION

The invention relates generally to methods of forming shells for drums which are used as percussion musical instruments from thermoplastic materials which are readily deformable at elevated temperatures which are not excessive and contemplates the use of an adhesive, such as glue, for attaching the edges of such material together after it has been heated to a temperature at which it is readily deformable by manual manipulation and which has its edges connected together by a construction which is adapted to receive an adhesive material such as glue which has a higher temperature at which it deforms than that of the plastic material. Attempts have been made to form plastic drums of clear methyl methacrylate, such as shown in Zickos U.S. Pat. No. 3,626,458. Some of such prior attempts utilized, for example, forming extruded material in pipelike form by cutting the material in pieces of various sizes for different types of drums. However, the shells shown in the Zickos Patent and the previous attempts to form drumshells of methyl methacrylate have not been successful when attempted on a production basis because the shells so formed had a tendency to warp, deform or come apart. Furthermore, it was not feasible or considered possible to form shells from such material in which an almost infinitesimal number of color designs could be accomplished by any known method or process.

In addition to transparent polymeric materials which are known as Lucite or Plexiglas, drum shells have also been made of fiberglas, but said shells have not proved to be satisfactory because of difficulties in methods of fabrication and interior surface finishing. The present inventors are not aware of any satisfactory methods which have heretofore been utilized for the successful manufacture of drum shells from thermoplastic or polymeric materials such as Lucite, Plexiglass or the like.

The advantages derived from the present invention result from a method of forming such shells from plastic material which includes the utilization of a special method which is described hereinafter.

SUMMARY OF THE INVENTION

By utilizing the method contemplated by the present invention, it is possible to form drum shells of methyl methacrylate or similar materials, which do not readily deform after being manufactured, which are economically feasible to produce and which permit the production of such drum shells with an almost infinitesimal number of designs and colors.

BRIEF DESCRIPTION OF THE DRAWINGS

FIG. 1 is an elevational view of the plastic panels used to form the drum shown in FIG. 2 prior to its being formed or bent into a circular shape;

FIG. 2 is a perspective view of the shell formed from the material of FIG. 1 resulting in a vertical band design;

FIG. 3 is an elevational view of plastic material which provides a two band spiral appearance such as shown in FIG. 4;

FIG. 4 is a perspective view of the shell showing the spiral appearance after it has been formed from the panel of FIG. 3;

FIG. 5 is an elevational view of the panels arranged to form the three band swirl effect shown in FIG. 6;

FIG. 6 is a perspective view of the shell when formed from the panels of FIG. 5;

FIG. 7 is an elevational view showing the panels prior to being formed into a shell of two band swirl design as shown in FIG. 8;

FIG. 8 is a perspective view of a shell formed from the material shown in FIG. 7;

FIG. 9 is an elevational view of the panels prior to being formed into the shell shown in FIG. 10;

FIG. 10 is a perspective view of a shell showing a three panel rainbow design formed from the material shown in FIG. 9;

FIG. 11 is an elevational view of the panels prior to being formed into the five band rainbow design shown in FIG. 12;

FIG. 12 is a perspective view of the shell formed from the material shown in FIG. 11;

FIG. 13 is a side elevational view partially in section showing the cutting step for the plastic material;

FIG. 14 is a partial side elevational view in section showing the assembly of the individual plastic panels;

FIG. 15 is a sectional view taken on line 15—15 of FIG. 14;

FIG. 16 is a side elevational view of a number of plastic panels joined at their edges;

FIG. 17 is a diagramatic view of an oven for heating the plastic panels shown in FIG. 16;

FIG. 18 is a view showing the plastic panels which have been softened in the oven, formed to provide a circular shell with a cloth applied thereto to retain the circular shape until the material hardens and also shows circular rims which may be applied to the top and bottom of the shell to determine the roundness thereof if so desired;

FIG. 19 is a perspective view of the plastic material as it is removed from the oven and also illustrates the cloth which is preferably diaper cloth secured thereto;

DESCRIPTION OF THE PREFERRED EMBODIMENT

Figure 20:
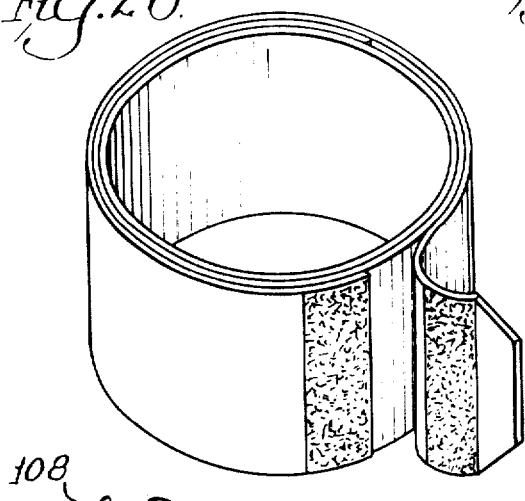
FIG. 20 is a perspective view which depicts the cloth which is applied to the plastic panel and which is attached to overlap and has its ends secured in an overlapping position during the cooling of the shell as shown in FIG. 19.

Referring specifically to the drawings which illustrate various embodiments of the invention, the assembled drums are designated throughout by numeral 20 and include retaining rings 22 at the top and bottom thereof connected to hollow cylindrical shells 21 by standard lugs 24. The retaining rings 22 retain drumheads, preferably formed of a polyester sheet such as Mylar which may be transparent, it being noted that in some instances only one such head is utilized at the top of the drum by a retaining ring 22. The numerals for the completed drums 20 including the lugs, retaining rings and heads 23 are the same throughout the description of the various embodiments of the invention for convenience.

The material of the shells 21 being formed of methyl methacrylate or the like (all such shells being hereinafter referred to as methyl methacrylate which is intended to include all similar materials) is preferably formed by first cutting a plurality of panels or strips from a large flat panel. The material used for the drum shells is readily deformable when heated to a temperature above ordinary room temperature and may be deformed into the desired hollow cylindrical shape either after the large sheet is cut into suitable panels which are secured together or may be formed of one piece which has been cut from the large sheet and deformed so that abutting edges thereof are secured together.

As shown in FIG. 1, a plurality of vertical plastic strips are attached together in a manner hereinafter described and may consist of strips of different colors such as, for example, a blue strip and a red strip 28, or two clear colored strips 30 or a clear colored strip and a clear uncolored strip. When the panel is formed as shown in FIG. 1, the resulting shell will be that shown in FIG. 2 which may be referred to as a vertical bar pattern.

FIG. 3 shows a flat panel generally designated by the numeral 62 formed from separate various colored strips of plastic material 64 which are glued together at 65 in a manner similar to that which is used to form a panel 26 of FIG. 1 as hereinafter described. The completed panel 62 is then cut along lines 70 to provide a panel 66 which is then formed into the spiral pattern drumshell shown in FIG. 4, since, when the panel 66 is cut along the lines 70, the two bands extend at an angle to the horizontal across the panel 66, which bands may be of different colors, or one of which may be of clear plastic material.

FIG. 5 shows another panel assembly 43 which may be formed of three panels 44, 45 and 46 of different colors, one of which may be of clear plastic, which are glued together along the diagonal lines 48 and 50. When this design is formed into a circular shell, it provides a three band swirl effect such as that shown in FIG. 6.

FIG. 7 shows another panel assembly including two colors 38 and 40 or again one may be formed of clear plastic material, which assembly is glued together along a diagonal line 42. When the panel, shown in FIG. 7, is formed into a circular shell, it provides a two band swirl effect such as shown in FIG. 8.

FIG. 9 shows a panel generally indicated by the numeral 31 which is formed from three vertical panels of plastic material 32, 34 and 36 which may be glued together at 37 and which again may be of various colors or one of which may be of clear plastic material. When the panel 31 is formed into a shell, it results in a three band rainbow effect such as shown in FIG. 10.

Referring to FIG. 11, a panel generally indicated at 51 is shown which is formed of different colored strips 52, 54, 56, 58 and 60 which are glued together at 50 to provide a five band rainbow effect such as shown in FIG. 12. Again, one or more of the strips may be formed of clear plastic material.

Referring to FIG. 13, a flat table, preferably formed of metal, is designated by numeral 74 on which large panels of plastic material 77 are placed for cutting them into smaller panels 78. The smaller panels 78 may be cut into any desired configuration to provide, for example, the assembled flat shell members such as shown, for example, in FIGS. 1, 3, 5, 7, 9 and 11. A special saw indicated at 76 is provided for cutting through the large panels 77 to form the rectangular panels 78. The saw includes a beveled or angular cutting surface 82 into a resultant angularly shaped cut in the material 77 as shown at 84. The large panel 77 is placed against a strip 86 to retain it in position during the cutting operation and bars or pressure strips 80 are positioned above the panel 77 on the table 74 in spaced relation so that the cutting edge of the saw 76 may pass through the plastic material 77 a distance sufficient to form the separate panels 78 with the beveled surfaces 84—84 and straight surfaces 91-91.

As shown in FIGS. 13 and 14, the separate panels 78 are then forced into contact with each other at their edges forming a V-shaped groove 90 with contacting surfaces 91. A special glue 92 is then placed in the V-shaped groove 90 and is prevented from passing through the connection between the panels by contacting surfaces 91. The glue 92 substantially fills the V-shaped groove 90 and excess glue is preferably removed by hand so that the top surface 93 thereof is smooth and is substantially coextensive with the upper surfaces of the panels 78. Tape 94 is then placed along the sides and ends of the panels 78 where they are glued together and extends completely around the panels and the glue in the groove 92 to prevent the escape of the glue.

As shown in FIG. 16, the individual panels generally indicated at 78 are thereby glued together. After the glue sets, the tape 94 which may have been placed over a protective paper layer 95 is manually removed.

FIG. 17 illustrates an oven 96 which may be heated by any heating means such as gas or electricity and the panels connected together by the glue in the designs in the configurations shown in the various embodiments of the invention are positioned in the oven so that they lay flat on the bottom thereof. The oven is preferably preheated to a temperature of approximately 320° F at the top and at the bottom to a temperature of approximately 300° F and is maintained at these temperatures by suitable controls (not shown). The panels 78 remain in the oven until they become flexible whereupon they may be removed manually therefrom and, as shown in FIG. 19, cloth material such as preferably diaper cloth 98 is placed upon one side of the panels 78 to which it lightly adheres by contact.

An important element of the method which results in the forming of a finished drum shell is that the melting or softening point of the glue 92 is higher than that of the plastic material and thus remains solid while the panels connected thereby are in the oven and also remains solid as the shell is formed into a circular or cylindrical shape.

The next step in the process or method is to bend the glue panels 78 into the drum shaped shell shown at 16 with the edges of the glued panel abutting as shown at 99. As a check to determine that the resulting shells are in a perfectly round or cylindrical shape, the shells may be placed in bottom and top retaining rings 102 as shown in FIG. 18. If the shells are not absolutely round or cylindrical, they are rejected.

Figure 24:
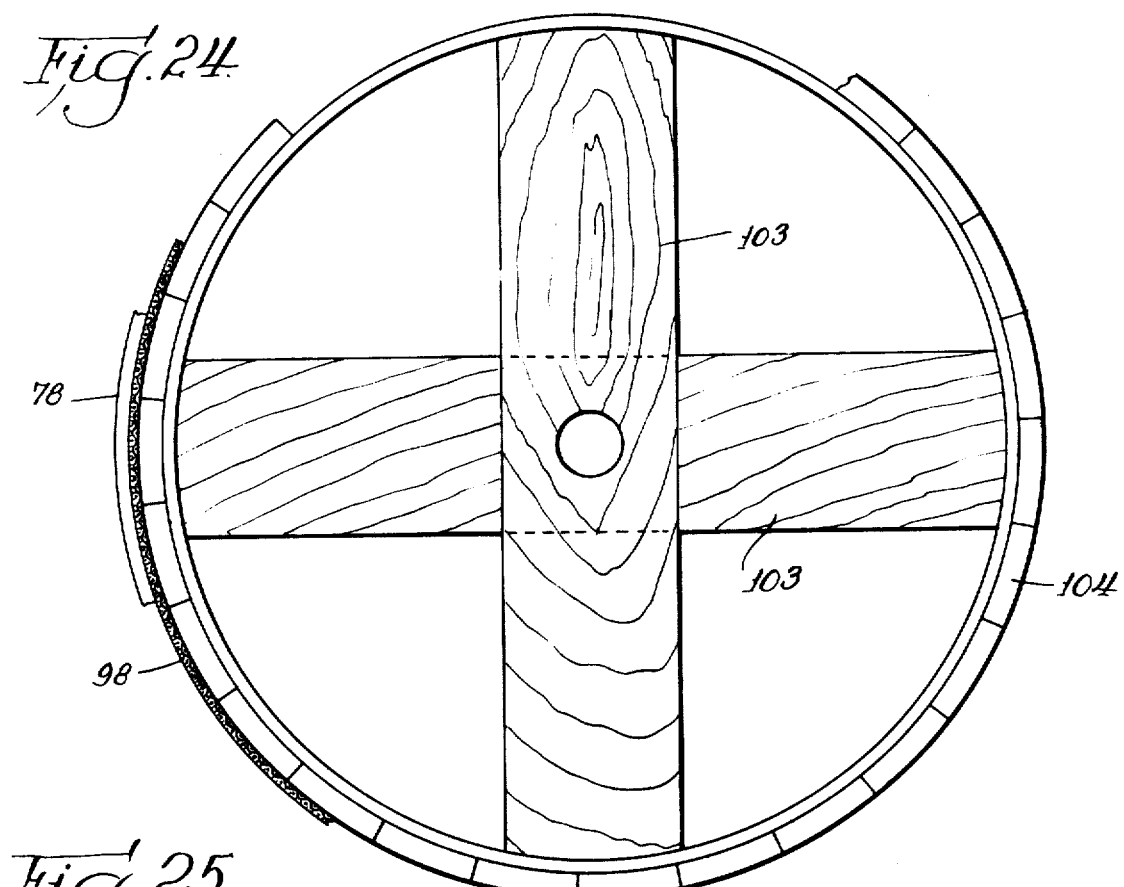
FIG. 24 is a top plan view of a shell and retaining members for holding the shell in a cylindrical formation.

The cylindrical shells may then be surrounded by a laminated flexible wooden member 104 as shown in FIG. 24, which laminated members may have cross members 103 positioned at the top and bottom thereof which are preferably made of wood to retain the circular configuration of the laminated wooden shells and the plastic shells. The diaper cloth 98 is preferably not removed from the plastic shells prior to the positioning of the members 104 and, if desirable, heavy paper may be affixed around the members 104.

Figure 25:
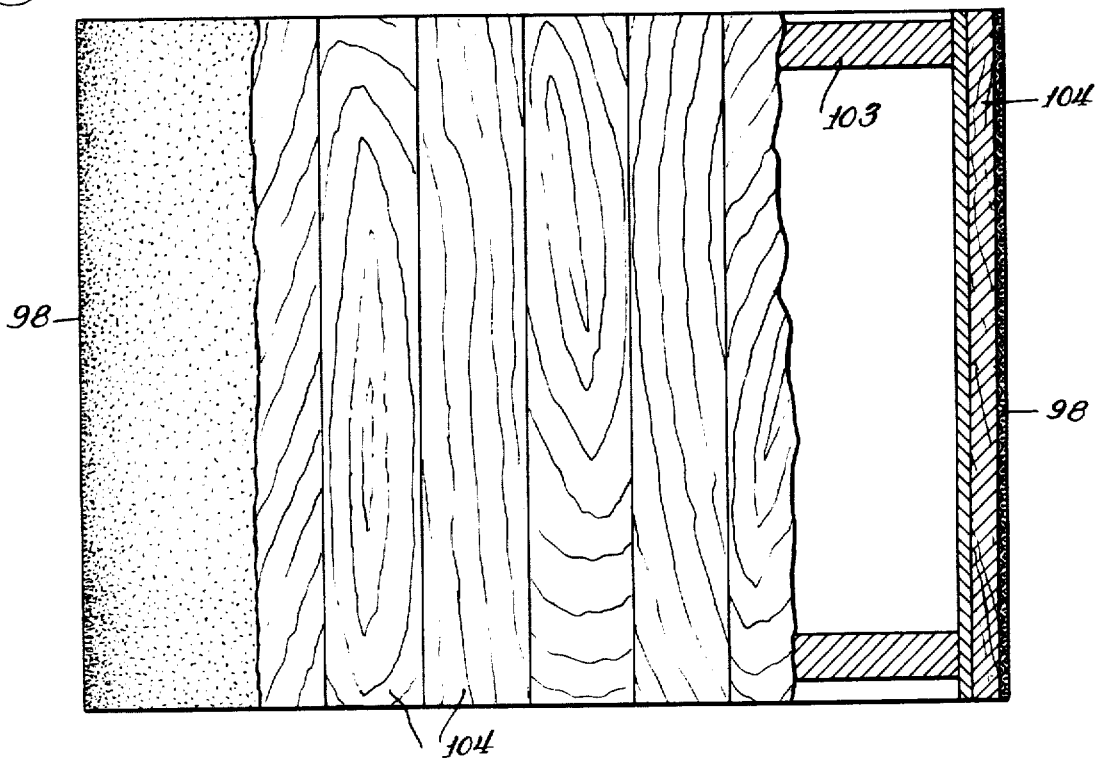
FIG. 25 is an elevational view with portions thereof broken away for the sake of clarity of the construction shown in FIG. 24.

FIG. 25 shows the parts of FIG. 19 partially in section after the flexible wooden members 104 are placed in position. The flexible wooden members 104 are not necessarily used with all sizes of plastic shells, but may be used with larger shells such as those which eventually become bass drums.

Figure 21:
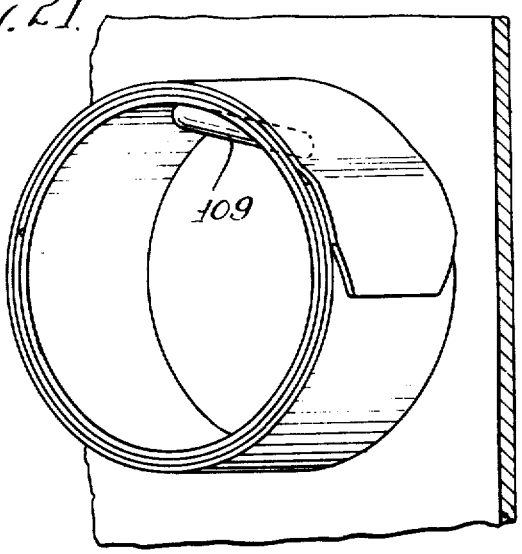
FIG. 21 is a perspective view showing the shell on a rack on which the shell is cooled.
Figure 22:
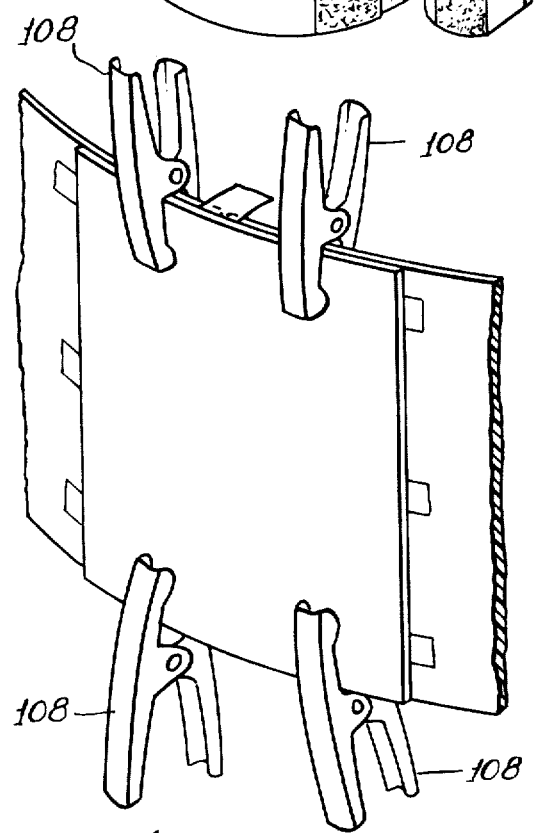
FIG. 22 is a partial perspective view of a clamp looking from the outer surface of the shell which is utilized to clamp the abutting edges of the shell together after glue has been inserted in the vertical V-shaped seam formed by said abutting edges.
Figure 23:
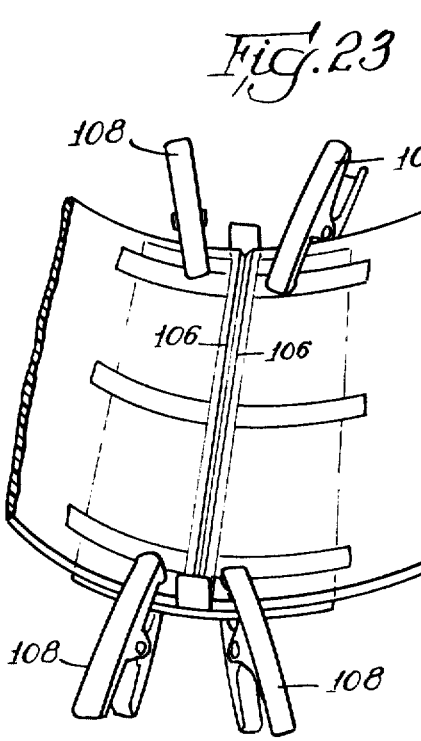
FIG. 23 is a view similar to FIG. 22 showing the clamp from the interior of the shell.

As shown in FIGS. 21, 22 and 23, after the cylindrical shells are placed in abutting relationship along unglued connecting edges 106, they are cooled on suitable racks 109 to room temperature after clamps 108 are positioned at the top and bottom of the shells to retain the edges in abutting relationship so that glue 92, similar to that previously described, may be inserted between the beveled edges. The shells are removed from the racks 109 and are then drilled by any appropriate means (not shown) for attachment of the retaining lugs 24 for the rings 22.

Figure 26:
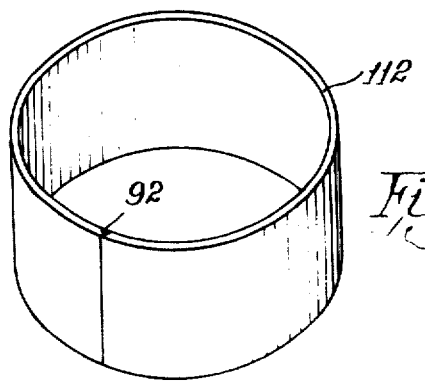
FIG. 26 is a perspective view of a finished cylindrical shell formed from a single color or transparent material in accordance with the invention.

FIG. 26 shows a completed shell 112 formed of a single panel of plastic material which has been made in accordance with the foregoing detailed description of our invention.

From the foregoing, it will be apparent that we have provided a novel method or process for forming drum shells of plastic material such as, for example, methyl methacrylate, which is relatively uncomplicated and by which completed drum shells of such plastic materials are cheaply and easily formed on a production scale. Also, many attractive shell designs may be created.

What is claimed is:

1. A method of manufacturing plastic shells for drums from a plastic material which is relatively non-deformable at room temperature and is readily deformable when heated to a temperature substantially above room temperature, said method comprising steps of:
    placing a large sheet of said plastic material on a substantially flat supporting surface when the material is at room temperature,
    forming plastic panels from said plastic material by cutting it into individual panels,
    forming a substantially V-shaped recess on one side of the sheet at said cut, which extends only partially through the panel,
    forming a straight cut adjacent each V-shaped recess,
    positioning the cut panels in abutting relation to each other so that the V-shaped recesses face generally upwardly and the straight cuts of said adjacent panels abut with each other,
    placing an adhesive having a higher deforming temperature than the temperature at which said plastic material becomes readily deformable to secure a desired plurality of said panels in an assembly,
    removing excess adhesive from the assembly,
    subjecting said assembly to a temperature at which said plastic material becomes readily deformable, but the adhesive material does not,
    deforming the assembly into a generally cylindrical form while still heated,
    thereafter placing the edges of the assembly in abutting relation with the straight cuts touching each other,
    permitting the resultant assembly to return to room temperature by exposing it to room temperature for a sufficient period of time, and
    placing adhesive in the V-shaped groove which has been formed by abutting the ends of the assembly together so that said shell is permanently retained in cylindrical form after hardening of the adhesive in the last mentioned V-shaped groove.

2. The method set forth in claim 1 wherein a retaining means is placed on the cylindrical shell in a position to retain said cylindrical shape.

3. The method set forth in claim 1 wherein a retaining ring is placed at least on one end of the cylindrical shell after it is formed to retain said cylindrical shape.

4. The method set forth in claim 1 wherein a circular drumhead retaining ring is placed at least on one end of the circular shell after completion thereof.

5. The method set forth in claim 1 wherein the panels are formed into generally rectangular shapes and wherein the panels, when glued together and the glued assembly formed into a cylindrical shell, create a generally rectangular panelled appearance.

6. The method as claimed in claim 1 wherein the panels are deformed into generally rectangular shapes and wherein said panels, after being glued together, are cut on a tilted parallelogram from the original glued assembly resulting in a parallelogram prior to being deformed into a cylindrical shell, whereby the resulting finished product has a spiral appearance of panels extending across said latter parallelogram.

7. The method claimed in claim 1 wherein said assembly, prior to deforming, is cut into various shapes and then glued together prior to being deformed into a cylindrical shell to produce various visual designs.

8. The method as set forth in claim 7 wherein the individual panels are of different hues or colors.

9. The method as claimed in claim 7 wherein the individual panels are of various opaque hues or colors.

10. The method as claimed in claim 7 wherein the panels are of various transparent hues or colors.

11. The method as claimed in claim 7 wherein alternate panels are formed of clear plastic material.

12. The method as claimed in claim 1 wherein said assembled panels, prior to being deformed, are cut into three matching triangular shapes and are glued together along matching edges thereof to provide a flat assembly in the shape of a parallelogram, which assembly, after being deformed into said cylindrical shell, provides a three band swirl appearance.

13. The method as claimed in claim 1 wherein said assembled panels, prior to being deformed, are cut into two matching triangular shapes and are glued together along matching edges thereof to provide a flat assembly in the shape of a parallelogram, which assembly, often being deformed into said cylindrical shell, provides a two band swirl appearance.

* * * * *